3,524,761
ZINC AMMONIA BORATE COMPLEX
Sidney B. Humphrey, Bel Air, Md., assignor to Humphrey Chemical Corporation, Edgewood Arsenal, Md., a corporation of Maryland
No Drawing. Filed Apr. 25, 1968, Ser. No. 724,221
Int. Cl. C09k 3/28
U.S. Cl. 117—138     11 Claims

ABSTRACT OF THE DISCLOSURE

Zinc ammonia borate complexes in aqueous solution are prepared having a zinc to boron atomic ratio of from 1:1 to 1:4. The water soluble complexes are used to impregnate combustible materials, e.g. textiles, and upon drying the complex decomposes to give a water insoluble zinc borate residue which imparts flame retardance.

---

The present invention relates to zinc ammonia borate complexes and their use in making fire retardant products.

It is an object of the present invention to prepare novel zinc ammonia borate complexes.

Another object is to prepare improved fire retardant compositions. A further object is to prepare zinc borate in a very fine particle size.

Yet another object it to render combustible materials less flammable.

A further object is to prepare zinc borates which are water soluble in one stage of the processing.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by preparing solutions of zinc ammonia borate complexes having an atomic ratio of zinc to boron of from 1:1 to 1:4 and incorporating such complexes into the material which it is desired to render less flammable and the converting the complex into an insoluble zinc borate residue in situ by drying. The drying is preferably accomplished at an elevated temperature up to the boiling point of the solvent but can be carried out at room temperature or even by freeze drying.

The preferred solvent employed in forming and using the complex is water but the complex can be formed in other solvents such as alcohols, e.g. methanol, ethanol and isopropanol or in mixtures of solvents, e.g. mixtures of water with methanol, ethanol or isopropanol. The preferred solvent is water.

It is critical that the atomic ratio of zinc to boron be between 1:1 and 1:4. Desirably the atomic ratio is at least 1:1.33 and preferably the atomic ratio of zinc to boron is from 1:2 to 1:3. If the amount of boron exceeds the 1:4 zinc to boron ratio there is a problem in obtaining a strongly insoluble compound after the ammonia is driven off from the complex. The complexes of the present invention are not stable in the absence of a solvent and in fact they cannot be isolated even as crystalline hydrates by drying. In contrast, known zinc ammonia borates which contain at least 5 atoms of boron per atom of zinc are known to be stable on drying, note Putnins, Chem. Abst., vol. 53, page 12077 (1959) and Putnins, Chem. Abst., vol. 57, page 4271 (1963).

The complexes of the present invention contain four moles of ammonia per atom of zinc and normally are prepared in aqueous ammonia solution. There should be an excess of at least 5% and preferably at least 10% of ammonia and as a practical upperlimit the ammonia can be present in an amount to saturate the water. It should be understood the the ammonia is employed to form a complex and not merely as a solvent. Examples of complexes within the present invention are:

(1)     $Zn(NH_3)_4 \cdot B_2O_4 x H_2O$
(2)     $2Zn(NH_3)_4 \cdot 3B_2O_4 x H_2O$
(3)     $3Zn(NH_3)_4 \cdot 2B_2O_4 x H_2O$ In the formulae the symbol $x$ merely indicates that an indeterminate amount of water is also present. Upon decomposition, e.g. by heat, the ammonia is removed and there are formed hydrated zinc borates, e.g.

$$ZnO \cdot B_2O_3 \cdot 2H_2O$$

from compound (1), $2ZnO \cdot 3B_2O_3 \cdot 7H_2O$ from compound (2), $3ZnO \cdot 2B_2O_3 \cdot 5H_2O$ from compound (3). Upon further heating the water of crystallization is also removed from the zinc borate although usually there is no need to remove such water of crystallization.

The zinc borates formed from the zinc ammonia borate complexes of the present invention have a very fine particle size, generally less than 1 micron and can be 0.01 micron or lower. Thus the present invention provides a way for obtaining an ultra fine pigment (zinc borate) by spray drying.

The zinc ammonia borates of the present invention cannot be made by slurrying zinc borate in water and then adding ammonia, such a procedure causes hydrolysis of the zinc borate and results in the formation of zinc hydroxide. Instead to form the zinc ammonia borate complexes of the present invention the zinc borate should be introduced into aqueous (or alcoholic) media containing an excess of ammonia.

The complex is only stable in mildly alkaline medium, e.g. up to pH 11, and is destroyed by strong acid or alkali. It is possible to form the complex utilizing as the boron source boric acid, boric anhydride, alkali metal borates, e.g. sodium borate or potassium borate providing that the boron compound is added to aqueous ammonia containing dissolved zinc compounds such as zinc oxide, zinc chloride, zinc sulfate, zinc hydrosulfite sludges, zinc hydroxide and zinc carbonate. When acidic zinc compounds are employed sufficient ammonia should be present to render the composition basic. The use of zinc chloride and zinc sulfate as the source of the zinc has the disadvantage of tendering textile materials, e.g. cotton so that they lose some of their tensile strength. Hence other sources of zinc which do not form strong acids on drying are the preferred source of zinc. Thus the complex is preferably formed by procedures such as adding zinc borate as a powder to aqueous ammonia or adding zinc oxide to aqueous ammonia and then adding boric acid to form the complex in situ.

At a pH of 9 to 10 the zinc ammonia borate complexes of the present invention are soluble in water at room temperature to an extent of at least 5%. In general the solubility in the aqueous ammonia increases with increase in temperature. The aqueous complex solution is water white but the complex appears to be white when precipitated out of water in small particle size.

The zinc ammonia borates can be shipped as a slurry wherein the borate is in solution and complex borates are the solid portion by removing a portion of the water. However, as indicated, the zinc ammonia borate complex cannot be dried without reverting to zinc borate. The slurry can be reconstituted to a solution with the aid of heat.

When the complexes are converted to zinc borate the drying can be accomplished at room temperature (or below), e.g. by freeze drying to −300° F. The only limit on the upper temperature is that it is determined by the ability of the material being treated to withstand heat. Drying can be hastened by blowing air over the material impregnated with the complex.

The zinc ammonia complex can be applied to textile materials (e.g. textile fibers and fabrics) made of cellulosic materials, e.g. cotton, regenerated cellulose, paper, cellulose acetate, cellulose acetate-butyrate or other textile materials such as polyethylene terephthalate (Dacron), nylon, polyethylene, polypropylene, vinyl chloride polymer fabrics, or mixtures of two or more textile materials. The complexes are particularly valuable for impregnated cellulosic materials such as paper and cotton. The complex can be used in an amount of 0.1 to 30% of the weight of the textile.

The zinc ammonia borate complexes also are useful in coating wood or paper to impart flame retardance and can be used in coatings such as latex paints from synthetic resins and elastomers.

Thus the zinc ammonia borate complex can be employed in a polyvinyl chloride latex, e.g. containing 50% polyvinyl chloride, in an amount of 1 to 5 parts of the polyvinyl chloride per part of complex. In place of polyvinyl chloride there can be used copolymers of vinyl chloride with vinyl acetate, vinylidene chloride, acrylates, e.g. ethyl acrylate, etc. They can also be used with chlorinated paraffins (e.g. 40–70% chlorine), chlorinated rubber, chlorinated polyethylene, chlorosulfonated polyethylene (Hypalon), chlorinated diphenyl. They can be used with plasticized polyvinyl chloride, e.g. plastisols and organosols, to prevent burning. (The plasticizer employed with vinyl chloride resins frequently are flammable.)

The can be used as fire retardant additives in butadiene-styrene latex, natural rubber latex, acrylic resin latices, vinyl acetate polymer latices, vinyl chloride polymer latices, etc.

The zinc ammonia borate complexes can be added to formulations having other fire retardants present, such as chlorinated paraffins, antimony trioxide, phosphates, etc.

The complexes can be applied to rug, carpet and upholstery backing, etc. In every case after drying the water soluble complex is converted to the water insoluble zinc borate.

The zinc ammonia borates of the present invention can be used for any of the uses of the zinc borates set forth in Clayton Pat. 2,172,698, with or without the other additives set forth in Clayton, and have the advantage that the complex is applied in a water soluble form and is then converted to the insoluble zinc borate in situ on the fabric or other material.

Unless otherwise indicated all parts and percentages are by weight.

EXAMPLE 1

Anhydrous ammonia gas is introduced into 750 ml. of water until it is saturated. Then 80 grams of ZB–112 was added slowly with agitation. Ammonia addition was continued during the addition of the ZB–112. A clear solution of the complex resulted. The solution was stable when heated to 150° F. ZB–112 is a commercial zinc borate hydrate having the formula $ZnO \cdot B_2O_3 \cdot 2H_2O$.

EXAMPLE 2

750 ml. of water were saturated with anhydrous ammonia and then 200 grams of ZB–237 added slowly with agitation with continued addition of ammonia. The product was heated to 150° F. and a clear solution of the complex resulted. Upon cooling to room temperature some crystals of the complex were formed in addition to the complex still in solution since the solubility of the product was exceeded. These crystals were soluble in aqueous ammonia, but decomposed in water due to hydrolysis.

ZB–237 is a commercial zinc borate hydrate having the formula $2ZnO \cdot 3B_2O_3 \cdot 7H_2O$.

In place of ZB–237 there can also be used ZB–325 a commercial zinc borate hydrate having the formula $3ZnO \cdot 2B_2O_3 \cdot 5H_2O$.

EXAMPLE 3

Anhydrous ammonia was added to 300 grams of water to saturate the same. Then 40 grams of ZB–112 were added with agitation while the addition of ammonia was continued. The resulting zinc ammonia borate complex was completely soluble in the aqueous ammonia.

EXAMPLE 4

4000 grams of aqueous ammonia (29.4% $NH_3$) were added to 4000 grams of water. Then 890 grams of ZB–112 were added slowly with agitation. The product was heated to 140° F. to give a clear solution of the complex.

EXAMPLE 5

35 grams of anhydrous ammonia gas were added to 400 grams of water. Then 12 grams of zinc oxide were added with agitation followed by 28 grams of boric acid. A clear solution of the zinc ammonium borate resulted.

EXAMPLE 6

To 350 grams of water there were added 350 grams of aqueous ammonia (29.4% $NH_3$) and then there were slowly added 77.7 grams of ZB–112 at 70–80° F. A clear solution was maintained until about 50 grams of the ZB–112 had been added. Upon the addition of more of the ZB–112 a grainy precipitate formed. Heating the solution to 140–150° F. dissolved the precipitate and permitted the addition of the balance of the ZB–112 to give a clear solution.

EXAMPLE 7

50 grams of $ZnSO_4 \cdot H_2O$ were added with agitation to 100 grams of aqueous ammonia (29.4% $NH_3$). Then 33.2 grams of boric acid were added to give a clear solution. The product of this example was not as stable as that of the other example since some solids formed after standing for several hours.

EXAMPLE 8

Cotton fabric suitable for children's sleepwear was impregnated with the aqueous zinc ammonia borate solution prepared in Example 1 and then dried at 250° F. to obtain a flame resistant fabric containing 10% of water insoluble zinc borate. The zinc borate particle size was less than 1 micron.

EXAMPLE 9

To 500 parts of a polyvinyl chloride latex containing 50% of solids there were added 790 parts of the aqueous zinc ammonia borate solution prepared in Example 3. This mixture was then applied as a coating on wood and dried.

It has been found that by inclusion of ammonium bicarbonate or ammonium carbonate the amount of complex in solution can be substantially increased, e.g. to give a 20% solution. The ammonium bicarbonate is preferably used in an amount equivalent to 146 to 230 grams of $CO_3^=$ per 1000 grams of water. The upper limit is simply a question of economics. If lower amounts of bicarbonate are employed the solubilizing effect is reduced. Desirably the amount of $CO_3^=$ equivalent should be at least 10% of the water weight.

Zirconyl ammonium carbonate or zirconium acetate can be employed to aid in bonding the zinc of the zinc ammonia complex to cellulose material. The amount of zirconium compound can be varied widely. There can be used 2 gram atoms of zirconium per gram atom of zinc. However, less zirconium is normally employed, e.g. 1 gram atom per gram atom of zinc. When reference is made to gram atoms of zirconium and zinc it should be realized that actually compounds of these elements are employed, the compounds having the equivalent amount of zirconium and zinc.

EXAMPLE 10

175 grams of aqueous ammonia (29.4% $NH_3$) were added to 402.1 grams of water. Then 158.1 grams of ammonium bicarbonate were added with agitation to form ammonium carbonate in situ. To this solution there were added 81.4 grams of zinc oxide with agitation. To the clear solution there were added with agitation 123.7 grams of boric acid along with sufficient anhydrous ammonia to maintain the pH at 9.1 to 9.5.

In this example the pH can be maintained at 8.8 to 10 but the range of 9.1 to 9.5 is preferred.

EXAMPLE 11

2750 grams of aqueous ammonia (29.4% $NH_3$) were added to 13,250 grams of water. To this solution 3,750 grams of ammonium bicarbonate were added with agitation. Then 5,000 grams of ZB-112 were added with agitation along with anhydrous ammonia to give a clear solution. The pH was maintained at 9.1 to 9.5 (although a pH between 8.8 and 10.0 is permissible).

EXAMPLE 12

75 grams of ammonium bicarbonate were added to 265 grams of zirconyl ammonium carbonate (10% $ZrO_2$ equivalent) solution to which were added 55 grams of aqueous ammonia (29.4% $NH_3$). 100 grams of ZB-112 were added with agitation along with anhydrous ammonia to maintain a pH of 8.5 to 9.0.

The zirconium compound serves as a binder forming a chemical link between the zinc and cellulose. In a specific example the composition of Example 12 was used to impregnate cotton fabric to give a product having 20% zinc borate on a dry basis.

In another example sufficient of the composition of Example 12 was applied to cotton fabric to provide 15% zinc borate on a dry basis.

EXAMPLE 13

400 grams of zinc ammonia borate (20% ZB-112) solution from Example 11 were added to 400 grams of Res-O-Sperse 3 (66.5% solid emulsion of chlorinated paraffin, 70% chlorine, in water) with agitation.

The chlorinated paraffin acts as a source of halogen to improve fire retardancy and also acts as a lubricant. The product as such can be applied to paper, duck, twills, burlap, osnaburg fabric, etc. to give a fireproof product.

Zinc borate is important in fire proofing compositions to eliminate after glow and after flame.

EXAMPLE 14

To the product of Example 13 there was added 40 grams of polyvinyl chloride latex (50% solids) to give a product useful for flame proofing and fire proofing paper, cotton fabrics and other cellulosic materials.

The polyvinyl chloride is not only an additional source of halogen but also improves the water resistance and the hand, minimizing the tack. The chlorinated paraffin in this case serves as a plasticizer for the polyvinyl chloride resin.

In place of polyvinyl chloride there can be used vinyl chloride copolymers, preferably containing at least 50% vinyl chloride, e.g. vinyl chloride-ethyl acrylate copolymer (80:20 or 65:35) vinyl chloride-acrylonitrile copolymer (85:15), vinyl chloride-vinylidene chloride (80:20).

EXAMPLE 15

600 grams of zinc ammonia borate were added to 450 grams of Res-O-Sperse 3 with agitation to form an emulsion. Span-80 (sorbitan monooleate) was used in an amount of 5% of the composition as an emulsifier to stabilize the emulsion (other conventional emulsifiers can be used).

The ratio of ZB-112 to the 70% chlorinated paraffin was 1:2.5. This ratio can be varied widely to give the desired fire retardant and physical properties.

In place of Res-O-Sperse 3 there can be used Res-O-Sperse A which is a resinous solid chlorinated paraffin (70% chlorine).

What is claimed is:

1. A mildly alkaline aqueous solution of a zinc ammonia borate complex, said solution having a pH of up to about 11 and said complex having a zinc to boron atomic ratio of from 1:1 to 1:4.

2. A mildly alkaline aqueous slurry of a zinc ammonia borate complex, said slurry having a pH of up to about 11 and said complex having a zinc to boron atomic ratio of from 1:1 to 1:4.

3. A complex solution according to claim 1 wherein the zinc to boron atomic ratio is from 1:2 to 1:3.

4. In a process of employing zinc borate as a fire retardant, the improvement comprising applying the zinc borate to the material to be protected as the water soluble zinc ammonia borate complex of claim 1 and then converting said complex to water insoluble zinc borate.

5. In a process of employing zinc borate as a fire retardant, the improvement comprising applying the zinc borate to the material to be protected as the water slurry of the soluble zinc ammonia borate complex of claim 2 and then converting said complex to water insoluble zinc borate.

6. A process according to claim 5 wherein the zinc to boron atomic ratio is from 1:1.33 to 1:3.

7. A process according to claim 5 wherein the material treated is cellulosic.

8. A complex according to claim 1 wherein the zinc to boron atomic ratio is from 1:1.33 to 1:3.

9. A composition according to claim 1 dissolved in water and including a member of the group consisting of ammonium carbonate and ammonium bicarbonate.

10. A composition according to claim 9 wherein said member contains the equivalent of at least 10% carbonate ions based on the weight of the water.

11. An aqueous emulsion including the complex of claim 1 and a chlorinated paraffin.

References Cited

UNITED STATES PATENTS

| 1,261,736 | 4/1918 | Ferguson | 252—8.1 |
| 2,573,253 | 10/1951 | Farber | 23—59 XR |

FOREIGN PATENTS

| 446,373 | 4/1936 | Great Britain. |

OTHER REFERENCES

Putnins et al.: Chemical Abstracts, vol. 57, p. 4271, 1962.

Putnins et al.: Chemical Abstracts, vol. 53, pp. 12077–78, 1959.

JOHN T. GOOLKASIAN, Primary Examiner

D. J. FRITSCH, Assistant Examiner

U.S. Cl. X.R.

117—143; 252—8.1; 23—59, 358; 106—15